3 Sheets—Sheet 1.

A. DIXON.
GAGE COCK.

No. 179,535.

Patented July 4, 1876.

Attest
Charles Thurman
R. N. Dyer.

Inventor.
Adam Dixon
by Geo. W. Dyer
Atty.

3 Sheets—Sheet 2.

A. DIXON.
GAGE COCK.

No. 179,535. Patented July 4, 1876.

Attest:
Charles Thurman
R. ? Dyer

Inventor.
Adam Dixon
by Geo. W. Dyer
Atty

A. DIXON.
GAGE COCK.

No. 179,535.

3 Sheets—Sheet 3.

Patented July 4, 1876.

UNITED STATES PATENT OFFICE.

ADAM DIXON, OF LONDON, ENGLAND.

IMPROVEMENT IN GAGE-COCKS.

Specification forming part of Letters Patent No. 179,535, dated July 4, 1876; application filed May 6, 1876.

*To all whom it may concern:*

Be it known that I, ADAM DIXON, of London, England, have invented improvements in apparatus for ascertaining the height or level of water or other fluids in steam-boilers or other vessels, of which the following is a specification:

Steam-boilers are usually fitted with two or three test or try cocks in addition to the ordinary glass gage, to secure not only a double means of ascertaining the height of the water within the boiler, but also to provide against any temporary inconvenience or risk of danger arising from the frequent breakage of the glass tubes of such gages.

These improvements are designed to provide an apparatus or instrument which will be an efficient substitute for the entire set of test or gage cocks now ordinarily used to gage the varying heights of water or steam in boilers and other vessels. I effect this object by the peculiar construction and use of the said apparatus, as hereinafter described; and, in order that my said invention may be more fully understood and readily carried into effect, I will now proceed to describe the accompanying drawings, in which—

Figure 1:
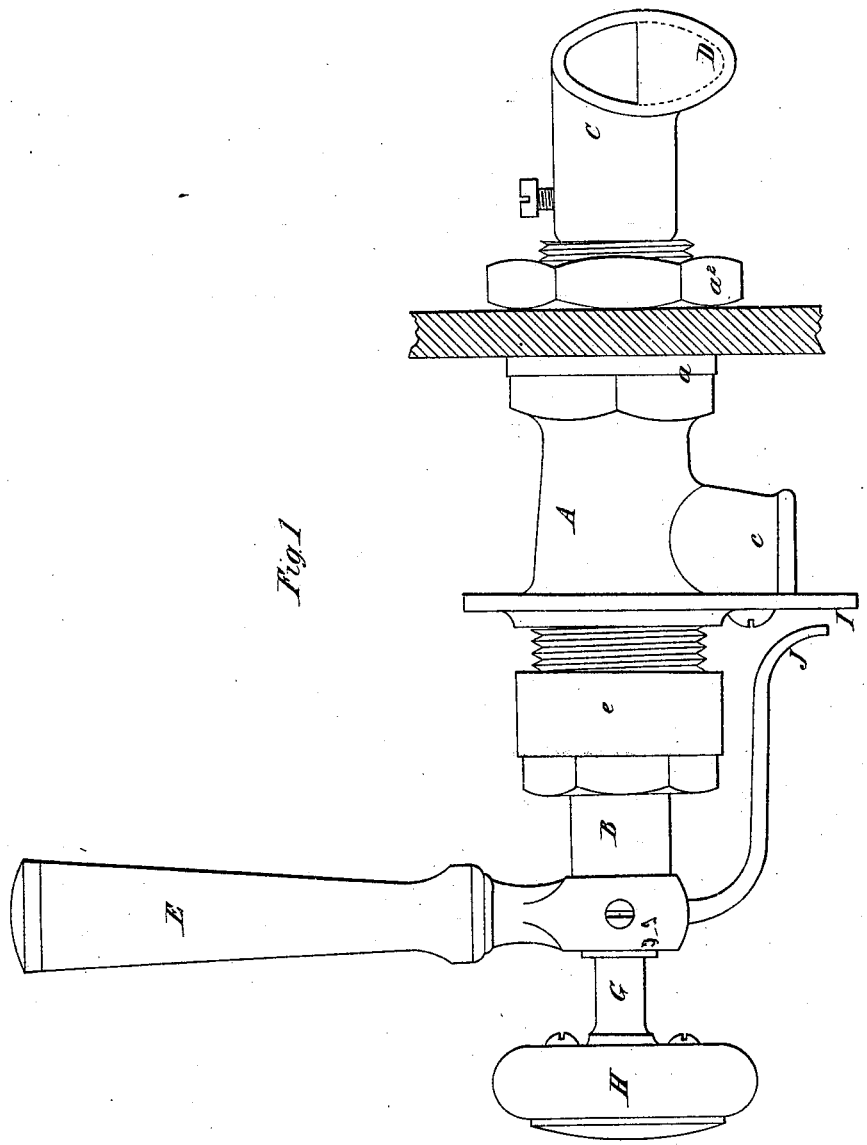
Figure 2:
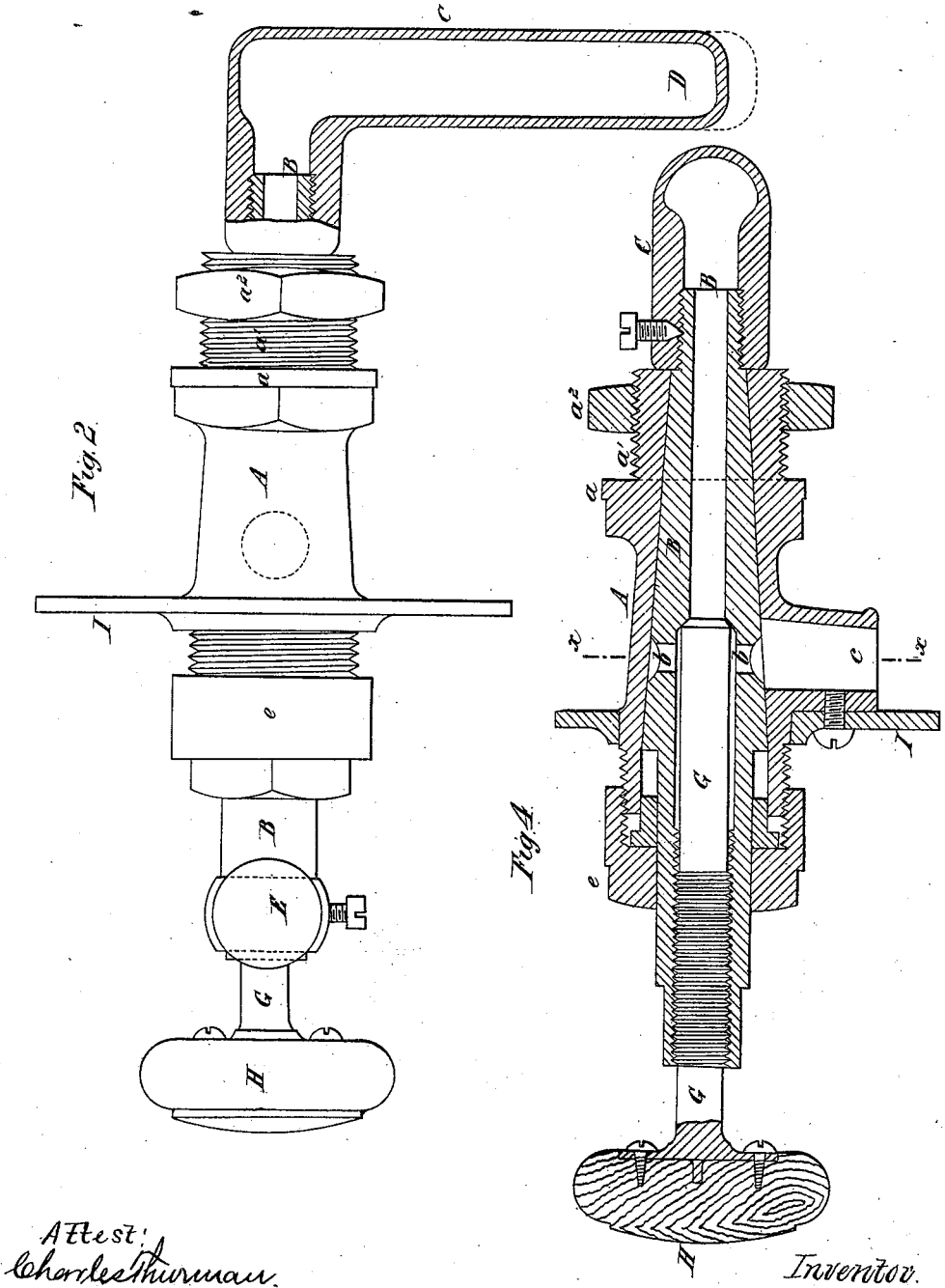
Figure 3:
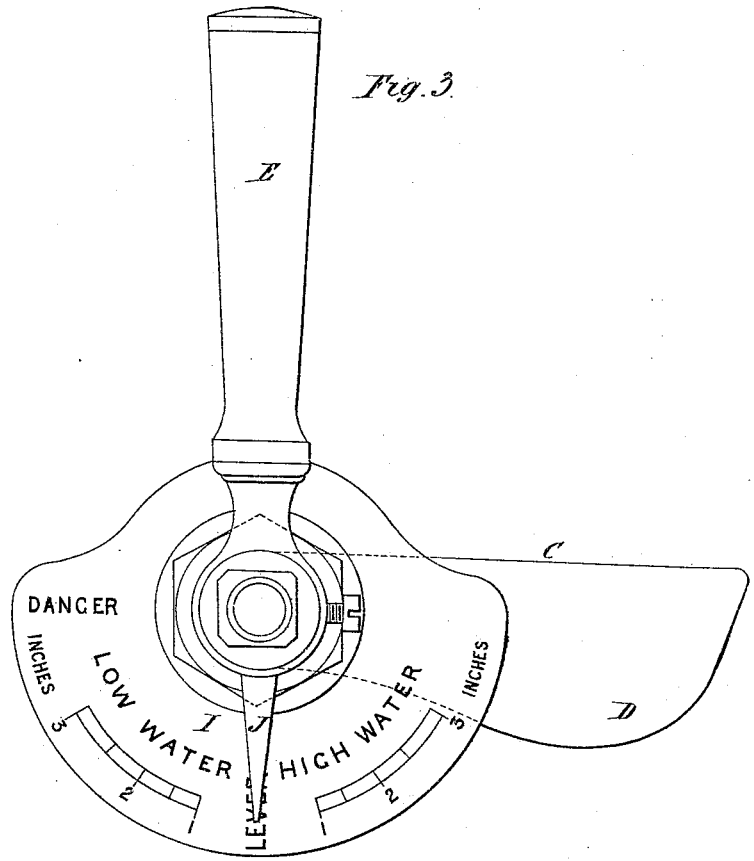
Figure 5:
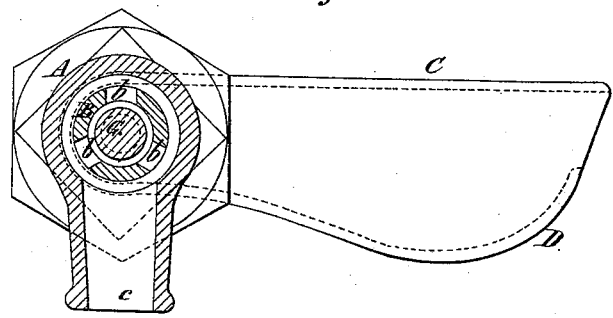

Figure 1 is an elevation of an apparatus or instrument constructed according to my invention. Fig. 2 is a plan or top view of the same, partly in section. Fig. 3 is a front-end elevation of the said apparatus, with a portion of the same removed. Fig. 4 is a longitudinal central section of the said apparatus or instrument. Fig. 5 is a transverse section on the line $x$ $x$, Fig. 4.

Like letters indicate the same parts throughout the drawings.

A is the main body of the hollow plug-cock. B is the hollow plug. C is the radial arm. D is the scoop-shaped portion thereof. E is the main handle for actuating the hollow plug B and the radial arm C. G is the screw-valve, with a hand-wheel, H. I is an index-plate. J is a pointer or finger attached to the handle E, and which moves over the said plate as the handle is turned. $a$ is a shoulder on the cock-body A. $a^1$ is a screwed portion thereof, which is inserted through a hole in the boiler-plate, and is made tight therein by the nut $a^2$. $b$ $b$ $b$ are holes in the plug B, whereby the communication is made between the interior of the plug and the discharge-nozzle $c$ of the cock. The plug G is provided with screw-gland $e$ and suitable packing for keeping it properly tight within the body.

Assuming steam to be up in the boiler and the radial arm in a horizontal position, should the water be at its proper level or above it, on opening the screw-valve G or the said auxiliary plug, the water will at once blow off; but if the water is below its proper level, by so turning the handle E on the hollow plug B as to depress the radial arm C inside the boiler, the height of the water will, if within the radius of the arm, at once be ascertained, as the superincumbent pressure of steam will force the water upward through the radial arm. The turning of the handle on the hollow plug in the direction to raise the radial arm will indicate either the presence of steam at the level to which the said arm is adjusted or too much water in the boiler. On the other hand, should steam be down and the water stand below its proper level, then the height of the water can be ascertained through the peculiar scoop-shaped construction of the mouth of the radial arm, whereby it lifts or scoops the water up from any level within the radius of the said arm, the pointer or finger showing on the index-plate the level to which the scoop has been lowered. Then, by the turning back or raising of the handle, the water will be discharged through the hollow plug B and nozzle C.

In lieu of the aforesaid screw-valve, I may, as above stated, use an auxiliary plug placed in the discharge-nozzle. I may also, if required, further modify the said apparatus, in various particulars of its construction, in any manner which will not change its essential features or impair the proper action of the various parts thereof, as above set forth.

It will be obvious to those familiar with the construction of steam-boilers and their fittings that my invention is very advantageous in various respects. It necessitates the making of only one hole instead of a number of holes in the boiler-plates, and its fitting into the same is effected by one simple operation, thereby reducing the possibility of leakage to a minimum and permitting great economy in labor. It, moreover, allows the height of the water to be ascertained with the utmost accuracy, not only at certain fixed points, but at any position within its range.

I claim as my invention—

1. In a gage-cock for steam-boilers, the combination, with the body A, of the hollow plug B, the radial tube C, the handle E, the screw-valve G, and the discharge-nozzle c, constructed and arranged substantially as described and shown.

2. The gage-cock for steam-boilers described, consisting of the body A, the hollow plug B, turning in the said body, the holes b in the said plug, the discharge-nozzle c, the radial tube C secured to the end of the said plug, the handle E, the screw-valve G, and the dial plate and pointer, all combined, constructed, and arranged as described and shown.

ADAM DIXON.

Witnesses:
HY. JAS. NOONE,
JN. DEAN.